(12) United States Patent
Allen et al.

(10) Patent No.: US 9,367,356 B2
(45) Date of Patent: Jun. 14, 2016

(54) RESOURCE ACCESS CONTROL

(75) Inventors: Brent Charles Allen, Bothell, WA (US); Joerg Raymond Brown, Woodinville, WA (US); Neil A. Brench, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 12/817,662

(22) Filed: Jun. 17, 2010

(65) Prior Publication Data

US 2011/0314475 A1 Dec. 22, 2011

(51) Int. Cl.
*G06F 9/46* (2006.01)
*G06F 9/50* (2006.01)

(52) U.S. Cl.
CPC ...... *G06F 9/5016* (2013.01); *G06F 2209/5021* (2013.01)

(58) Field of Classification Search
CPC ..................................................... G06F 9/5016
USPC ......................................................... 718/103
See application file for complete search history.

(56) References Cited

U.S. PATENT DOCUMENTS

| | | | |
|---|---|---|---|
| 5,255,270 A | | 10/1993 | Yanai et al. |
| 5,490,272 A | * | 2/1996 | Mathis et al. ............... 718/108 |
| 5,664,106 A | * | 9/1997 | Caccavale ................... 709/224 |
| 6,012,123 A | | 1/2000 | Pecone et al. |
| 6,023,720 A | * | 2/2000 | Aref et al. ................... 718/103 |
| 6,026,027 A | | 2/2000 | Terrell et al. |
| 7,076,605 B1 | | 7/2006 | Son |
| 7,137,119 B1 | * | 11/2006 | Sankaranarayan et al. ... 718/103 |
| 7,441,081 B2 | | 10/2008 | Humlicek |
| 7,620,773 B2 | | 11/2009 | Nicholson et al. |
| 2005/0120059 A1 | * | 6/2005 | Verma et al. .................. 707/200 |
| 2007/0022425 A1 | * | 1/2007 | Jackson ........................ 718/104 |
| 2009/0182945 A1 | | 7/2009 | Aviles et al. |

OTHER PUBLICATIONS

"File Caching", Retrieved at << http://msdn.microsoft.com/en-us/library/aa364218(VS.85).aspx >>, Mar. 11, 2010, pp. 2.

Hughes, Dave., "Designing Fail-Safe Storage for Embedded Systems", Retrieved at << http://static.businessreviewonline.com/user/whitepapers/HCC_data_storage_embedded_systems_MDBR.pdf >>, Retrieved Date: Apr. 19, 2010, pp. 6.

* cited by examiner

*Primary Examiner* — Timothy A Mudrick
(74) *Attorney, Agent, or Firm* — Jim Banowsky; Raghu Chinagudabha; Micky Minhas (57) ABSTRACT

Various embodiments can control access to a computing resource (e.g., a memory resource) by detecting that a high priority activity is accessing the resource and preventing a lower priority activity from accessing the resource. The lower priority activity can be allowed access to the resource after the high priority activity is finished accessing the resource. Various embodiments enable memory operations to be mapped to account for changes in data ordering that can occur when a lower priority activity is suppressed. For example, when an activity requests that data be written to a logical memory region, a mapping is created that maps the logical memory region to a physical memory region. The data can then be written to the physical memory region.

22 Claims, 8 Drawing Sheets

RESOURCE ACCESS CONTROL

BACKGROUND

Due to the number of processes running on today's computing devices, competition for computing resources can occur. This competition can sometimes result in undesirable interruptions in processes. For example, when a user is interacting with a user interface on a computing device, competition for a processor and/or memory resource can cause the user interface to temporarily freeze while it waits for another process to finish accessing the resource. This phenomenon may reduce the user's enjoyment of the computing experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments can control access to a computing resource (e.g., a memory resource) by detecting that a high priority activity is attempting to access the resource and preventing a lower priority activity from accessing the resource. The lower priority activity can be allowed access to the resource after the high priority activity is finished accessing the resource.

In some embodiments, access to a memory resource can be controlled by caching memory operations (e.g., data write and/or file close operations) for a lower priority activity while allowing a high priority activity to access the memory resource. When it is detected that the high priority activity is not accessing the memory resource, the cached memory operations can be transacted to memory. For example, data associated with a cached write operation can be written to memory and/or a file associated with a cached file close operation can be closed.

Various embodiments enable memory operations to be mapped to account for changes in data ordering that can occur when a lower priority activity is suppressed. For example, when an activity requests that data be written to a logical region of memory, a mapping is created that maps the logical memory region to a physical memory region. The data is written to the physical memory region and the mapping of the logical memory region to the physical memory region is recorded. When an activity then requests to read data from the logical memory region, the mapping is consulted and the data is read and returned from the physical memory region. According to some embodiments, the mapping of logical memory regions to physical memory regions can allow memory operations that may occur out of order (e.g., out of order temporally due to the suppression of an activity) to nonetheless maintain the integrity of their data ordering when read from memory.

BRIEF DESCRIPTION OF THE DRAWINGS

The same numbers are used throughout the drawings to reference like features.

DETAILED DESCRIPTION

Overview

Various embodiments can control access to a computing resource (e.g., a memory resource) by detecting that a high priority activity is attempting to access the resource and preventing a lower priority activity from accessing the resource. The lower priority activity can be allowed access to the resource after the high priority activity is finished accessing the resource. In some embodiments, examples of activities can include applications, processes, threads, and so on. According to some embodiments, activities can be designated as "high priority activities" or "low priority activities" using a variety of different techniques, such as designation by a programmer or other entity, automatic designation by way of association with a particular application (e.g., a web browser), designation by an end user, and so on.

For purposes of illustration, consider the following example implementation scenario. A mobile device includes a graphical user interface (GUI) via which a user can interact with the mobile device. GUI access to computing resources of the mobile device (e.g., access to memory) can be considered a high priority activity. According to some embodiments, when a GUI activity is reading data from memory, a lower priority activity (e.g., a database update activity) is prevented from accessing the memory. This prevents the GUI activity from having to wait for memory access which can cause interruptions in the user's interaction with the GUI. When the GUI activity is finished reading from memory, the lower priority activity can then be permitted to access the memory.

In some embodiments, access to a memory resource can be controlled by caching memory operations (e.g., data write and/or file close operations) for a lower priority activity while allowing a high priority activity to access the memory resource. When it is detected that the high priority activity is finished accessing the memory resource, memory operations (e.g., the cached memory operations) can be transacted to memory. For example, data associated with a cached write operation can be written to disk or a file associated with a cached file close operation can be closed.

According to some embodiments, data writes associated with a high priority activity (e.g., a GUI activity) can be delayed until after cached memory operations are written to a memory resource. This can prevent an error from occurring when a data write associated with a high priority activity includes a dependency on a data write associated with a lower priority activity. Thus, in some embodiments, a high priority data write can be delayed until after lower priority data writes are transacted to memory.

Various embodiments enable memory operations to be mapped to account for changes in data ordering that can occur when a lower priority activity is suppressed. For example, when an activity requests that data be written to a logical memory region, a mapping is created that maps the logical memory region to a physical memory region. The data is written to the physical memory region and the mapping of the logical memory region to the physical memory region is recorded. When an activity then requests to read data from the logical memory region, the mapping is consulted and the data is read and returned from the physical memory region. According to some embodiments, the mapping of logical memory regions to physical memory regions can allow memory operations that may occur out of order (e.g., out of order temporally due to the suppression of an activity) to nonetheless maintain the integrity of their data ordering when read from memory. Thus, in some embodiments, the temporal order of memory operations is preserved such that, if a device restart occurs, data can be read from memory according to a safe memory state.

In the discussion that follows, a section entitled "Operating Environment" is provided and describes one example environment in which one or more embodiments can be employed. Following this, a section entitled "Example Access Controller" describes an example access controller in accordance with one or more embodiments. Next, a section entitled "Example Memory Layout and Mapping" describes how logical memory regions and physical memory regions of a memory can be mapped in accordance with one or more embodiments. Following this, a section entitled "Example Methods" describes example methods in accordance with one or more embodiments. Last, a section entitled "Example System" describes an example system that can be utilized to implement one or more embodiments.

Consider now an example operating environment in which one or more embodiments can be implemented.

Operating Environment

Figure 1:
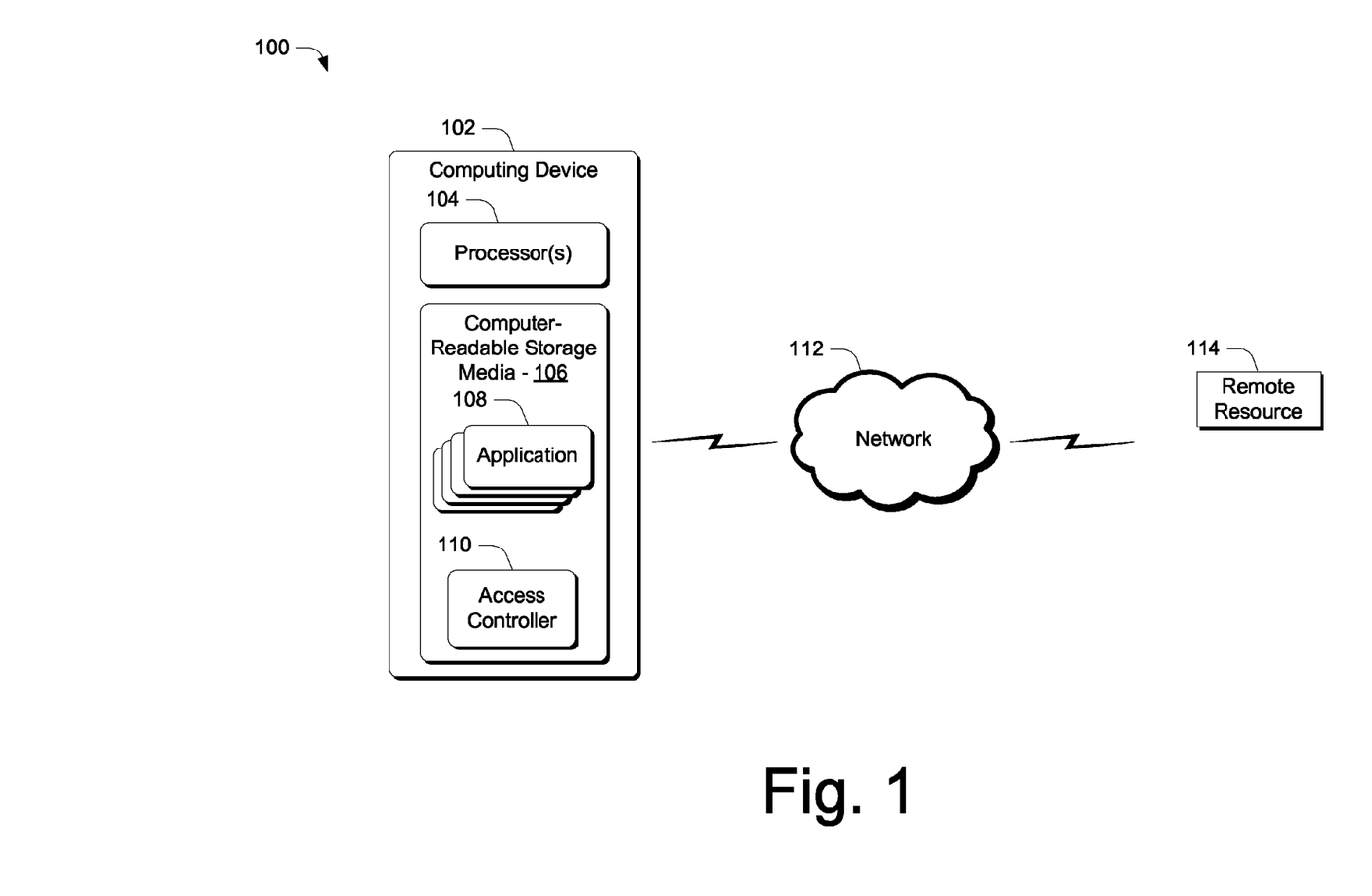
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

In addition, computer-readable storage media 106 includes an access controller 110 that can be utilized to implement embodiments discussed herein and that is configured to operate as described below. In operation, access controller 110 can perform a variety of functions, such as detecting high priority activities, suppressing lower priority activities, mapping logical memory regions to physical memory regions, and so on. Example components and operational characteristics of access controller 110 are discussed in more detail below.

According to one or more embodiments, access controller 110 and/or its constituent components can be implemented via software or program modules. Generally, software includes routines, programs, objects, components, data structures, and so forth that perform particular tasks or implement particular abstract data types. An implementation of these modules may be stored on or transmitted across some form of computer-readable media. The computer-readable media may include a variety of available medium or media that may be accessed by a computing device. By way of example, and not limitation, computer-readable media may comprise "computer-readable storage media."

In addition the above-mentioned features, environment 100 includes a network 112, such as the Internet, and one or more remote resources 114 that can be accessed by and have access to computing device 102. It is to be appreciated and understood that one or more components of access controller 110 can be accessed by and/or reside on a server or network-accessible computer (e.g., remote resource 114), other than computing device 102. Computing device 102 can be embodied as any suitable computing device such as, by way of example and not limitation, a desktop computer, a portable computer, a handheld computer such as a personal digital assistant (PDA), cell phone, a mobile device, and the like.

Having described an example operating environment, consider now a discussion of an example access controller in accordance with one or more embodiments.

Example Access Controller

Figure 2:
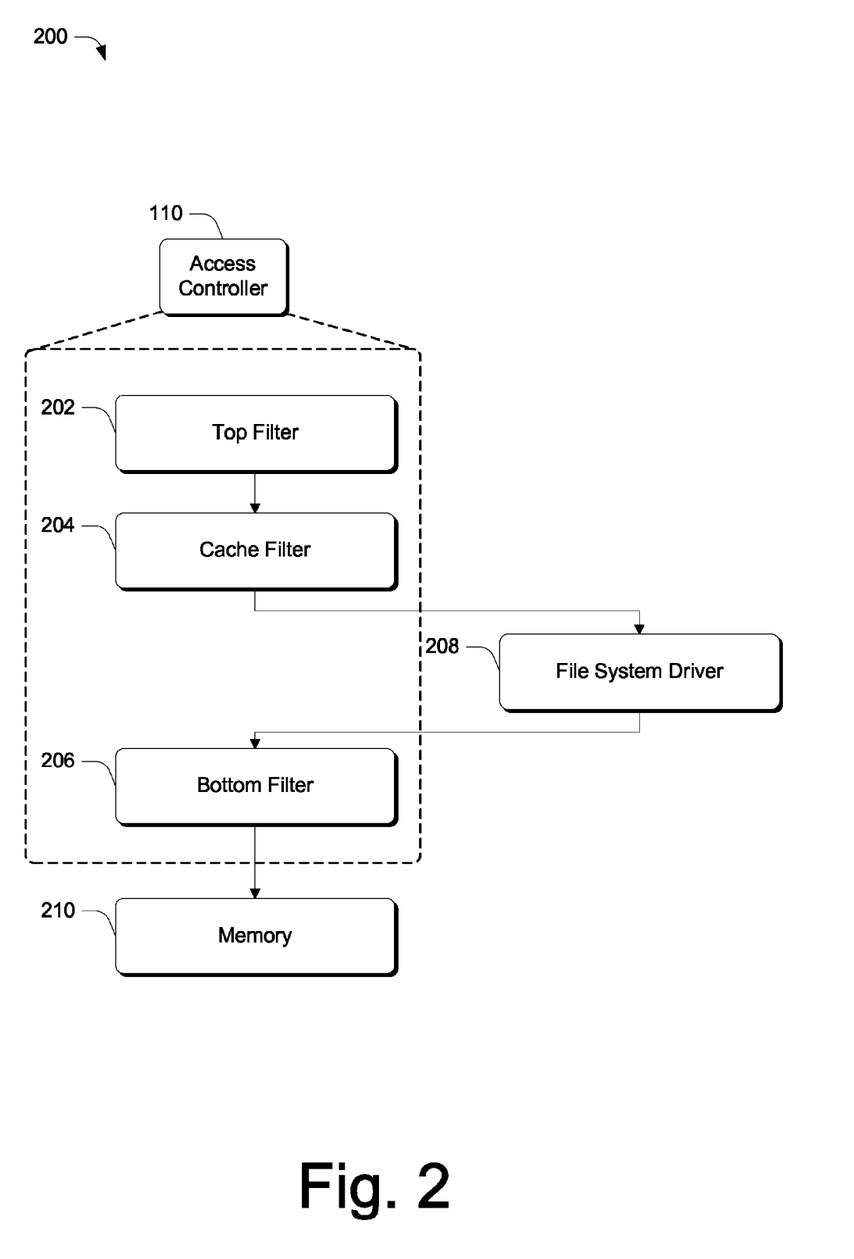
FIG. 2 illustrates an example access controller in accordance with one or more embodiments.

FIG. 2 illustrates at 200 one example implementation of access controller 110 in accordance with one or more embodiments. Access controller 110 includes a top filter 202, a cache filter 204, and a bottom filter 206. Also illustrated at 200 although not necessarily included as part of access controller 110 are a file system 208 and a memory 210. These example aspects associated with access controller 110 are each discussed in more detail below.

According to some embodiments, top filter 202 is operable to control access to computing resources such as memory 210. Examples of memory 210 include computer-readable storage media, examples of which are presented above and below. In at least some embodiments, top filter 202 can control access to memory 210 by suppressing memory operations such as flush operations and/or file close operations.

In some embodiments, a flush operation refers generally to the process of writing data from a cache (e.g., a RAM cache) to a memory resource such as memory 210. A flush operation can occur when an activity (e.g., an application) requests a flush and/or when a file is closed. Top filter 202 can suppress a flush operation by preventing a flush request from being passed to other components (e.g., cache filter 204 and/or file system 208). Top filter 202 can also suppress a flush operation by maintaining a file handle for a file that is closed by an activity such that closing the handle by the activity does not cause a flush operation to occur. This aspect of flush suppression is discussed in more detail below.

According to some embodiments, cache filter 204 is operable to manage certain aspects of file and/or data caching. For example, cache filter 204 can maintain some memory resource as a cache for an activity and/or application that resides on computing device 102. In one or more embodiments, when a high priority activity is accessing memory 210, cache filter 204 maintains cached data in an associated cache (e.g., for a suppressed lower-priority activity). When top filter 202 detects that the high priority activity is not accessing the memory 210, top filter 202 notifies cache filter 202 that it can flush cached data. Cache filter 202 can then cause cached data to be written to memory 210.

In some embodiments, bottom filter 206 is configured to receive a request to write data to a logical region of memory 210 and, responsive to the request, map the logical region to a physical region of the memory. For example, with reference to a disk memory, a physical region can correspond to a physical sector of the disk. The data can be written to the physical region and when a request is received to read data from the logical region, the data from the physical region can be retrieved in response to the read request. Thus, in some embodiments bottom filter 206 can maintain a data structure that tracks mappings between logical regions of memory 210 and physical regions of the memory. Bottom filter 206 can also track which physical regions of memory 210 have been written and which physical regions of memory 210 are available to be written to.

According to one or more embodiments, bottom filter 206 can also maintain a set of logical region to physical region mappings that represent a safe state of memory 210 that can be reloaded from memory if a system interruption occurs. Examples of a system interruption include a hard device reset, a battery failure, a battery removal, and so on. If a system interruption occurs, bottom filter 206 can indicate to the system a set of logical region to physical region mappings that represent the safe state of memory 210, and that set of mappings can be used to reload data from the memory. Aspects of logical region to physical region mappings and memory state maintenance are discussed in more detail below. In some embodiments, file system driver 208 driver is configured to interact with access controller 110 to implement a file system associated with computing device 102. As part of maintaining the file system, file system driver 208 can specify and/or determine a format in which data is stored on memory 210. According to one or more embodiments, bottom filter 206 can interact with file system driver 208 to ensure that file system driver 208 has access to a logical view of memory 210 that complies with the file system format even if the actual physical region write layout does not. For example, file system driver 208 can request data from memory 210 according to a particular logical region layout and bottom filter 206 can utilize a logical region to physical region mapping to retrieve data from memory 210 according to a physical region layout that differs from the logical region layout requested by file system driver 208.

Having described an example access controller, consider now a discussion of example memory layout and mapping in accordance with one or more embodiments.

Example Memory Layout and Mapping

Figure 3:
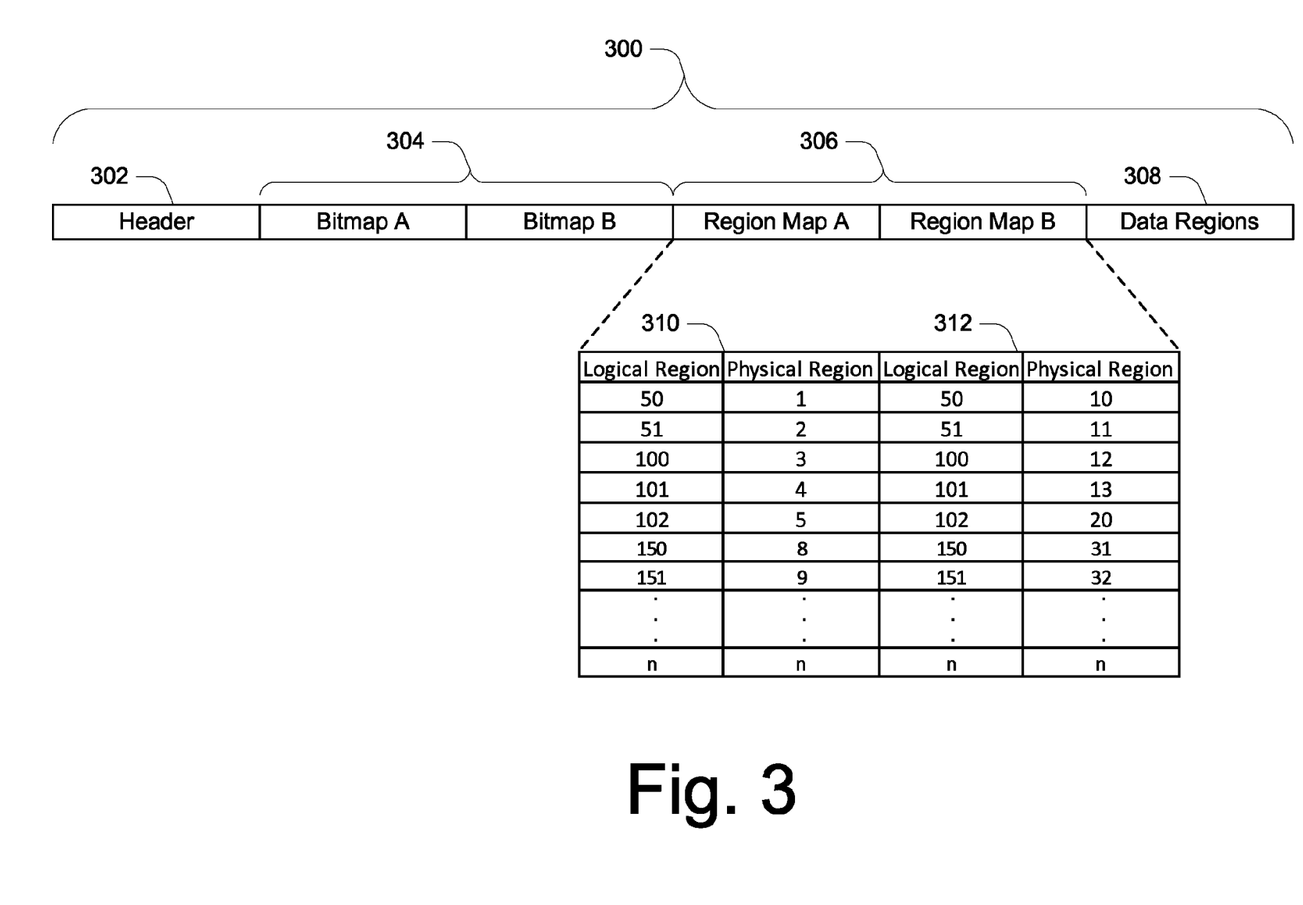
FIG. 3 illustrates one example of a memory layout in accordance with one or more embodiments.

FIG. 3 illustrates generally at 300 one example of a memory layout in accordance with one or more embodiments. In some embodiments, multiple states of the memory can be tracked via memory layout 300. To enable multiple states of the memory to be tracked, memory layout 300 includes a header 302, bitmaps 304, region maps 306, and data regions 308. According to some embodiments, header 302 can be utilized to store information regarding states of the memory. For example, header 302 can indicate which of the bitmaps 304 and/or region maps 306 correspond to a safe state of the memory and thus can be used to reload data from memory (e.g., after a hard restart).

Bitmaps 304 include an indication of which regions are available to be written to. For example, the multiple states of the memory can include an "A" state and a "B" state. Thus, bitmaps 304 can include a bitmap A which indicates which regions are available to be written to according to the A state, and a bitmap B which indicates which regions are available to be written to according to the B state.

Region maps 306 include mappings of logical regions to physical regions for multiple states of the memory (e.g., the A state and/or the B state). Data regions 308 are the actual physical regions of the memory (e.g., sectors) that store data on the memory. According to some embodiments, region maps 306 include a region map 310 and a region map 312. Region map 310 includes logical region to physical region mappings for the A state of the memory and region map 312 includes logical region to physical region mappings for the B state.

According to some embodiments, for each logical region, one of the multiple states of the memory (e.g., the A state or the B state) can be designated as a safe state of the memory that can be used to reload data from memory for a particular logical region. For purposes of illustration, assume that the A state is the safe state of the memory for a logical region 50. Thus, the A state can be maintained as a static version of the logical region 50 and the physical region 1 (indicated in the region map 310) will not be available to be written to. If a system restart occurs (e.g., due to a user-initiated hard restart and/or a power loss), region map 310 will be used to reload data from memory for logical region 50 and thus data for logical region 50 will be read from physical region 1. Reloading data from memory can include reloading all or part of an operating system, processes, applications, and so on.

In some embodiments, a memory operation (e.g., a write operation) associated with logical region 50 that occurs after the A state has been designated as a safe state will be included as part of the B state. For example, a write operation that occurs after the A state has been designated as a safe state can be mapped and recorded as part of the region map 312. Thus, the A state can remain static and provide a safe state that can be reloaded from memory. The B state can allow for further changes to memory to be made without compromising the integrity of the A state. In some embodiments, physical regions associated with region map 310 do not overlap with physical regions associated with region map 312. Thus, in some embodiments, a write made to a physical region according to region map 312 will not overwrite a physical region indicated in region map 310.

According to some embodiments, the designation of the safe state of the memory (e.g., for a particular logical region to physical region mapping) can be changed. For example, region map 310 can initially be designated as a safe state for logical region 50 (e.g., the mapping to physical region 1). A subsequent write to logical region 50 can be indicated in region map 312 (e.g., the mapping to physical region 10). The mapping for logical region 50 indicated by region map 312 can be saved to memory and header 302 can be updated to indicate that region map 312 corresponds to a safe state of the memory for logical region 50. This can allow physical region 1 to then be made available for data writes since physical region 10 will now be used for any lookups to logical region 50.

While memory layout 300 is illustrated with reference to two memory states (e.g., the A state and the B state), this is not intended to be limiting. Any number of memory states can be utilized without departing from the spirit and scope of the claimed embodiments.

In some embodiments, maintaining multiple states of a memory can cause available physical memory space (e.g., available physical regions) to be reduced. To manage the reduction in available physical memory space, in some embodiments bottom filter 206 monitors the amount of available physical memory space and can communicate this amount to other components of access controller 110, such as top filter 202. If bottom filter 206 ascertains that the amount of physical memory space available for data writes has fallen below a threshold amount (e.g., in megabytes), bottom filter 206 can communicate to top filter 206 that lower priority activities should stop being suppressed so that the active state of the memory (e.g., one of the region maps 306) can be saved to memory and thus become the safe state of the memory. When this occurs, the physical memory space utilized by the previous safe state is no longer protected and is made available for data writes. According to some embodiments, the previous safe state of the memory can then be utilized as the active state of the memory.

Having described example memory layout and mapping, consider now a discussion of example methods in accordance with one or more embodiments.

Example Methods

Figure 4:
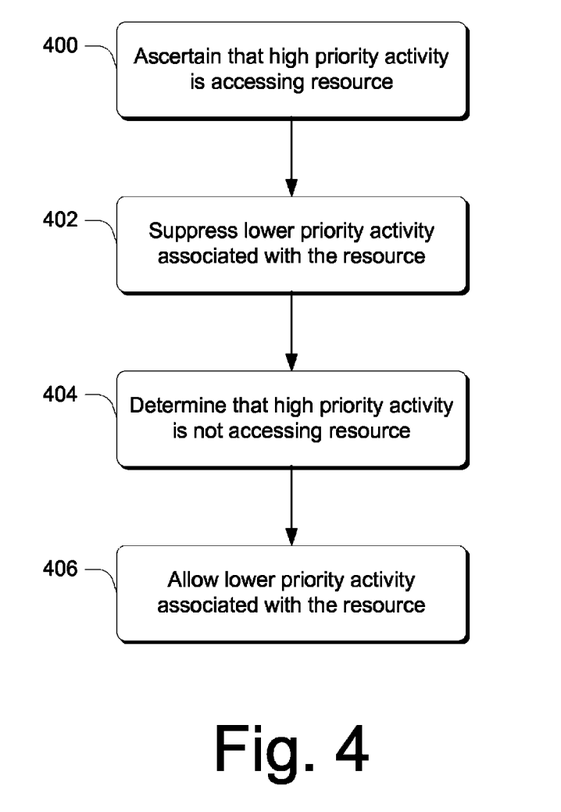
FIG. 4 is a flow diagram that describes steps in a method in accordance with one or more embodiments.

FIG. 4 is a flow diagram that describes steps in a method in accordance with one or more embodiments. The methods discussed herein can be implemented in connection with any suitable hardware, software, firmware or combination thereof. In at least some embodiments, aspects of the methods discussed herein can be implemented by software modules, such as access controller 110. It is to be appreciated and understood that the methods discussed herein can be performed by a suitably-configured server, a network-accessible computing device, and/or a client computing device. For purposes of illustration, certain aspects of the methods herein are discussed with reference to memory layout 300.

Step 400 ascertains that a high priority activity is accessing a resource. For example, a graphical user interface activity can be reading data from memory. Step 402 suppresses a lower priority activity associated with the resource. In some embodiments, the lower priority activity can include a flush operation associated with an application or other process, examples of which are discussed above.

According to some example embodiments, when a lower priority activity is being suppressed, data operations associated with the lower priority activity are stored in a cache. For example, cache filter 204 (FIG. 2) can monitor the cache for available storage space. If the amount of storage in the cache gets below a certain amount, cache filter 204 can cause the cache to flush data to free-up cache storage space even if top filter 202 is currently suppressing data flushes. In some embodiments, when the cache receives a data read request from a lower priority activity for data that is not in the cache, the cache can retrieve the data from a memory resource even if top filter 202 is suppressing data flushes.

Step 404 determines that the high priority activity is not accessing the resource. Step 406 allows the low priority activity associated with the resource. For example, top filter 202 can indicate to cache filter 204 and/or bottom filter 206 that a flush operation can now be performed. In some embodiments, the top filter 202 is configured to track which lower priority activities have been suppressed and indicate to other components of access controller 110 that the lower priority activities and/or associated flushes can now be performed.

According to some embodiments, when it is determined that a high priority activity is not accessing a resource, a low priority activity associated with the resource can stop being suppressed after a certain time period expires. For example, after a high priority activity is finished reading data from memory, a timer can be started. If the timer expires before any additional high priority reads are detected, access to the resource by lower priority activities can stop being suppressed. If a high priority activity accesses the resource before the timer expires, however, the timer can be stopped and/or reset. The timer can then be restarted once the higher priority activity is no longer accessing the resource.

Figure 5:
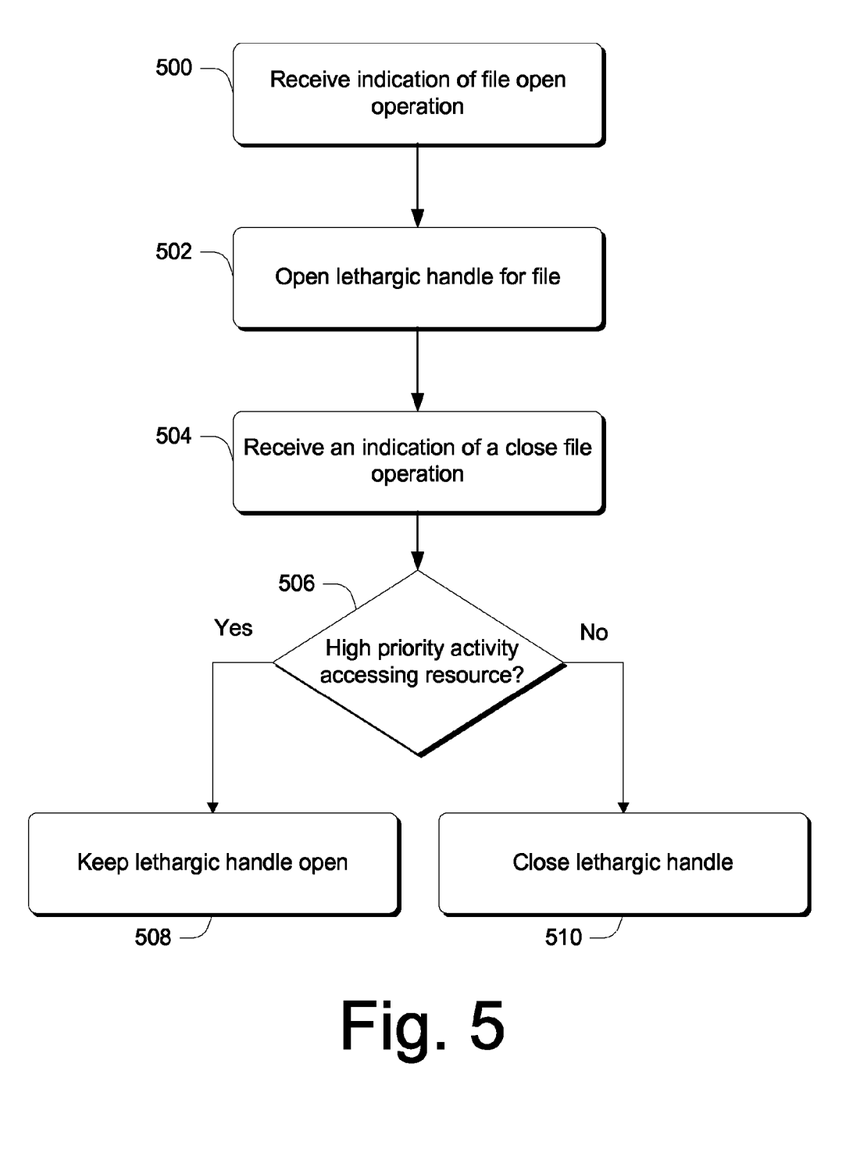
FIG. 5 is a flow diagram that describes steps in a method in accordance with one or more embodiments.

FIG. 5 is a flow diagram that describes steps in a method in accordance with one or more embodiments. In some embodiments, the method can be implemented to control file close operations and/or to prevent a flush operation from occurring responsive to a file close operation when a high priority activity is accessing a resource.

Step 500 receives an indication of a file open operation. For example, an application or other activity can cause a file to be opened. Step 502 opens a lethargic handle for the file. According to one or more embodiments, the lethargic handle is opened automatically when a file is opened and can be used (e.g., by top filter 202) to prevent the file from being closed while a high priority activity is accessing a resource and/or while lower priority activities are being suppressed. In some embodiments, the lethargic handle includes no read permissions, no write permissions, and imposes no sharing restrictions on an associated file. Thus, according to some embodiments, the lethargic does not conflict with permissions associated with other file handles. Step 504 receives an indication of a close file operation. For example, an application or other activity that opened the file can initiate the close file operation.

Step 506 determines if a high priority activity is accessing a resource. As discussed above, one example of a high priority activity accessing a resource is a GUI activity reading data from memory. If a high priority activity is accessing a resource ("Yes"), step 508 keeps the lethargic handle open. According to some embodiments, keeping the lethargic handle open prevents a flush from occurring due to the file close operation. If a high priority activity is not accessing a resource ("No"), step 510 closes the lethargic handle. In some embodiments, closing the lethargic handle can allow a flush operation (e.g., initiated via cache filter 204) to occur.

Figure 6:
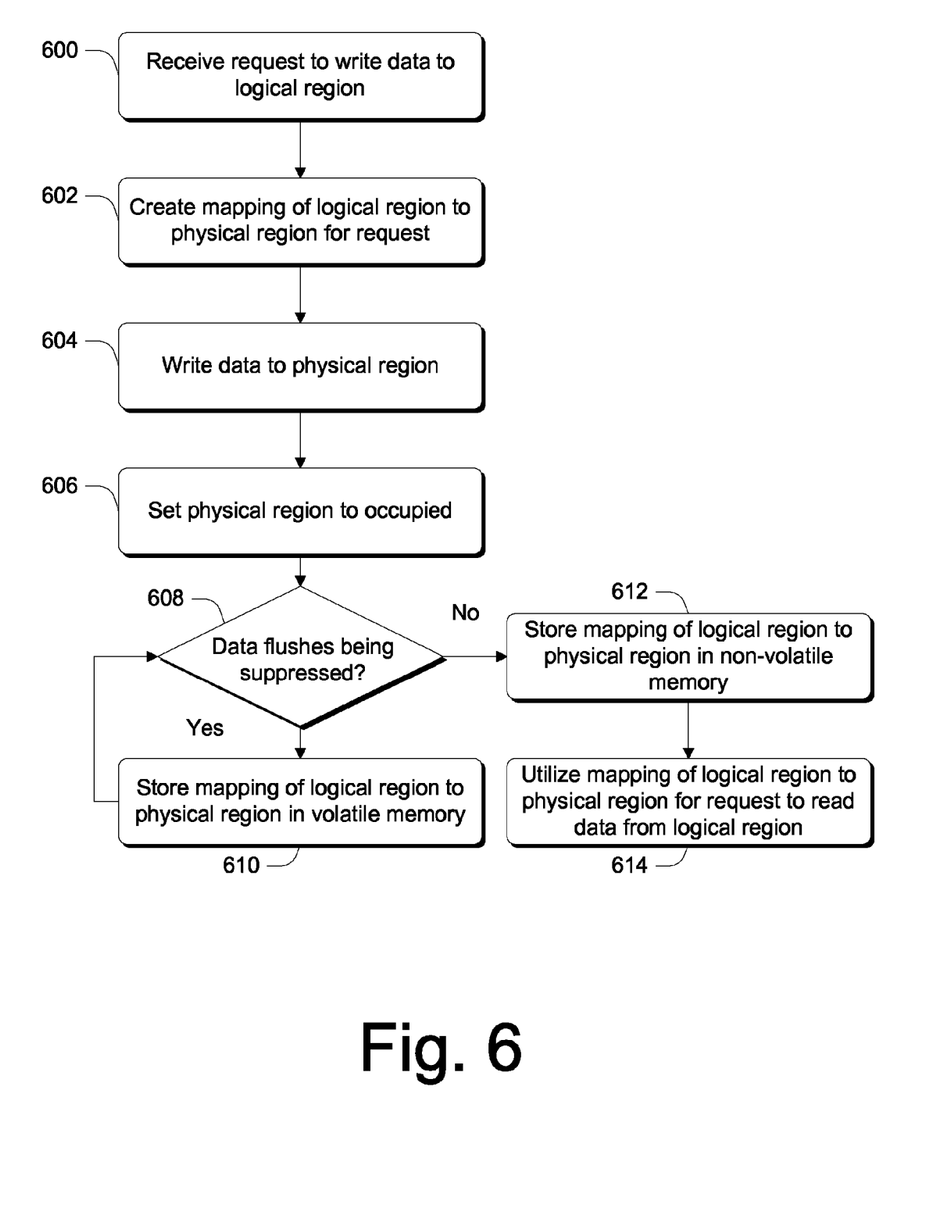
FIG. 6 is a flow diagram that describes steps in a method in accordance with one or more embodiments.

FIG. 6 is a flow diagram that describes steps in a method in accordance with one or more embodiments. In some embodiments, the method can be implemented to enable mappings of logical regions to physical regions for data writes to be maintained. Step 600 receives a request to write data to a logical region. For example, an application or other activity can submit data to be written to a logical region of a disk memory. Step 602 creates a mapping of the logical region to a physical region for the first request. According to some embodiments, before a mapping of a logical region to a physical region occurs, a list of available physical regions is first inspected to determine a physical region that is available for the data write. For example, bitmaps 304 can be inspected to locate a physical region that is available to be written to.

Step 604 writes the data to the physical region. Step 606 sets the physical region to occupied. For example, bitmaps 304 (of FIG. 3) can be marked to indicate that the physical region is being used to store data. Step 608 determines if data flushes are being suppressed. For example, data flushes can be suppressed responsive to a high priority activity reading data from a memory resource. If data flushes are being suppressed ("Yes"), step 610 stores the mapping of the logical region to the physical region in volatile memory. For example, the mapping of the logical region to the physical region can be stored in RAM.

If data flushes are not being suppressed ("No"), step 612 stores the mapping of the logical region to the physical region in non-volatile memory. Step 614 utilizes the mapping of the logical region to the physical region for a request to read data from the logical region.

In some embodiments, if a device restart happens before the mapping of the logical region to the physical region is stored in non-volatile memory (e.g., before step 612), the mapping of the logical region to the physical region can be lost since the mapping is stored in volatile memory which may lose power during a device restart. In these embodiments, a previously-stored mapping of the logical region to a physical region can be utilized in responsive to a request to read data from the logical region.

Figure 7:
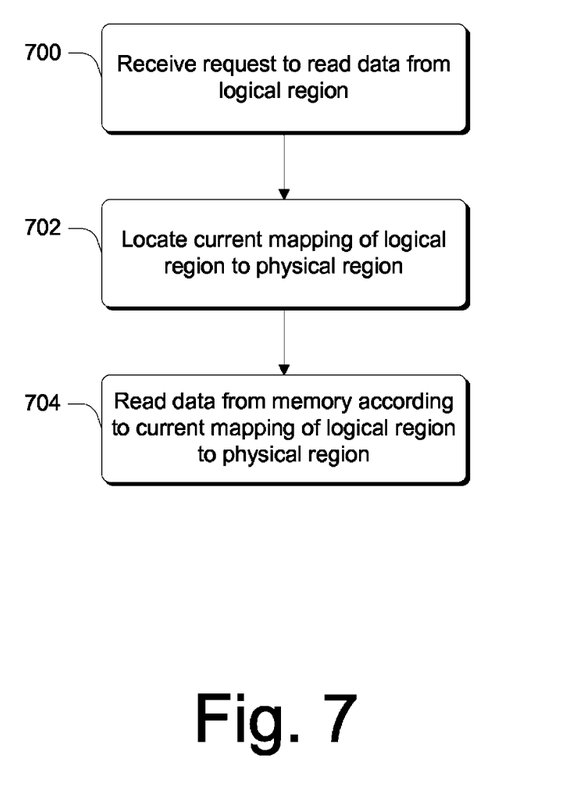
FIG. 7 is a flow diagram that describes steps in a method in accordance with one or more embodiments.

FIG. 7 is a flow diagram that describes steps in a method in accordance with one or more embodiments. In some embodiments, the method can be implemented to read data according to mappings of logical regions to physical regions.

Step 700 receives a request to read data from a logical region. Step 702 locates a current mapping of the logical region to a physical region. For example, one of region maps 306 can be designated (e.g., by header 302) as the current mapping of the logical region to a physical region. Step 704 reads data from memory according to the current mapping of the logical region to the physical region.

Having described example methods, consider now a discussion of an example system in accordance with one or more embodiments.

Example System

Figure 8:
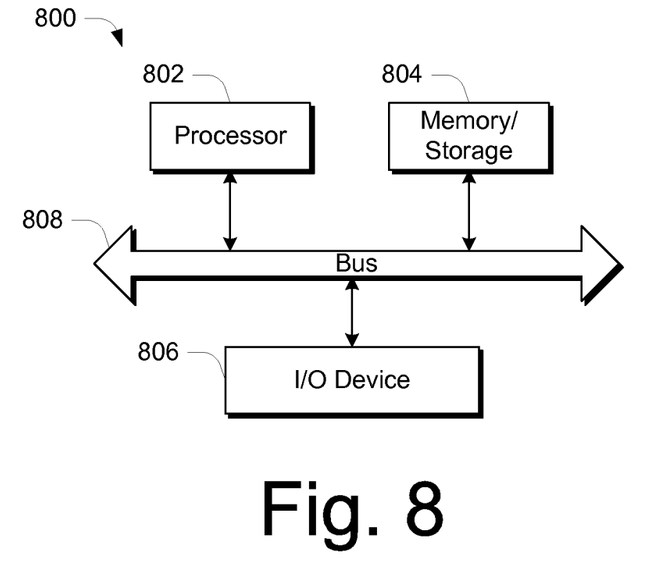
FIG. 8 illustrates an example system that can be used to implement one or more embodiments.

FIG. 8 illustrates an example computing device 800 that can be used to implement the various embodiments described above. Computing device 800 can be, for example, computing device 102 of FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments can control access to a computing resource (e.g., a memory resource) by detecting that a high priority activity is accessing the resource and preventing a lower priority activity from accessing the resource. For example, the lower priority activity can be prevented from flushing data from a cache to memory. The lower priority activity can be allowed access to the resource after the high priority activity is finished accessing the resource. For example, memory operations associated with the lower priority activity can then be flushed from the cache to memory. Various embodiments enable memory operations to be mapped to account for changes in data ordering that can occur when a lower priority activity is suppressed. For example, when an activity requests that data be written to a logical memory region, a mapping is created that maps the logical memory region to a physical memory region. The data can then be written to the physical memory region.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at a computer system that includes one or more processors and a memory resource, for coordinating access to the memory resource, the method comprising:
   ascertaining that a high priority activity is accessing the memory resource, and that a lower priority activity concurrently requests access to the memory resource;
   responsive to said ascertaining, suppressing the lower priority activity by at least caching one or more memory operations of the lower priority activity in a cache memory while the high priority activity accesses the memory resource, rather than writing the one or more memory operations to the memory resource while the high priority activity accesses the memory resource;
   subsequent to suppressing the lower priority activity, determining that the high priority activity has stopped accessing the memory resource;
   based at least on determining that the high priority activity has stopped accessing the memory resource, transacting the one or more memory operations from the cache memory to the memory resource; and
   delaying one or more data writes by the high priority activity to the memory resource until after the one or more memory operations have been transacted from the cache memory to the memory resource.

2. The method of claim 1, the high priority activity includes a data read activity associated with the memory resource.

3. The method of claim 2, wherein the data read activity is associated with a graphical interface.

4. The method of claim 1, wherein the lower priority activity comprises a data flush.

5. The method of claim 4, wherein the data flush is associated with a file close operation.

6. The method of claim 1, wherein the lower priority activity comprises a database update and wherein suppressing the lower priority activity comprises suppressing a data flush associated with the database update.

7. The method of claim 1, wherein the lower priority activity comprises a flush operation, and wherein suppressing the lower priority activity comprises:
   receiving an indication of a close operation for a file; and
   suppressing the flush operation by maintaining a handle for the file.

8. The method of claim 1, further comprising flushing data from the cache in response to determining that an amount of storage in the cache has fallen below a specified amount.

9. The method of claim 1, wherein determining that the high priority activity has stopped accessing the memory resource comprises:
   starting a timer responsive to an instance of high priority access to the memory resource;
   resetting the timer responsive to subsequent high priority activity access to the computing resource before the timer expires; and
   determining that the high priority activity has stopped accessing the resource responsive to the expiration of the timer.

10. The method of claim 1, wherein the one or more data writes by the high priority activity are delayed while caching the one or more memory operations of the lower priority activity.

11. At least one hardware storage device storing computer-executable instructions that are executable by one or more processors of a computing device to perform operations comprising:
   ascertaining that a high priority activity is accessing a memory resource of the computing device, and that a lower priority activity concurrently requests access to the memory resource;
   responsive to said ascertaining, suppressing the lower priority activity by at least caching one or more memory operations of the lower priority activity in a cache memory while the high priority activity accesses the memory resource, rather than writing the one or more memory operations to the memory resource while the high priority activity accesses the memory resource;
   subsequent to suppressing the lower priority activity, determining that the high priority activity has stopped accessing the memory resource;
   based at least on determining that the high priority activity has stopped accessing the memory resource, transacting the one or more memory operations from the cache memory to the memory resource; and
   delaying one or more data writes by the high priority activity to the memory resource until after the one or more memory operations have been transacted from the cache memory to the memory resource.

12. The at least one hardware storage device of claim 11, wherein the high priority activity includes a data read activity associated with the memory resource.

13. The at least one hardware storage device of claim 11, wherein the lower priority activity comprises a flush operation, and wherein suppressing the lower priority activity comprises:
   receiving an indication of a close operation for a file; and
   suppressing the flush operation by maintaining a handle for the file, the handle including no read permissions and no write permissions for the file.

14. The at least one hardware storage device of claim 11, wherein the operations comprise flushing data from the cache in response to determining that an amount of storage in the cache has fallen below a specified amount.

15. The at least one hardware storage device of claim 11, wherein the computer-executable instructions are executable to determine that the high priority activity has stopped accessing the resource by:
   starting a timer responsive to an instance of high priority access to the memory resource;
   resetting the timer responsive to subsequent high priority activity access to the computing resource before the timer expires; and
   determining that the high priority activity has stopped accessing the resource responsive to an expiration of the timer.

16. The at least one hardware storage device of claim 11, wherein the one or more data writes by the high priority activity are delayed while caching the one or more memory operations of the lower priority activity.

17. A system comprising:
   one or more processors;
   a memory; and
   one or more computer-readable storage media storing computer-executable instructions that are executable by the one or more processors to cause the system to perform at least the following:
      ascertain that a high priority activity is currently reading data from the memory, and that a lower priority activity concurrently requests access to the memory;
      responsive to said ascertaining, suppress the lower priority activity by at least caching one or more memory operations of the lower priority activity in a cache while the high priority activity reads the data from the memory, rather than writing the one or more memory operations to the memory while the high priority activity reads the data from the memory;
      subsequent to suppressing the lower priority activity, determine that the high priority activity has stopped reading data from the memory;
      based at least on determining that the high priority activity has stopped reading the data from the memory, transact the one or more memory operations from the cache to the memory; and
      delay one or more data writes by the high priority activity to the memory until after the one or more memory operations have been transacted from the cache to the memory.

18. The system of claim 17, wherein the lower priority activity comprises a flush operation, and wherein said suppressing comprises:
   receiving an indication of a close operation for a file; and
   suppressing the flush operation by maintaining a handle for the file, the handle including no read permissions and no write permissions for the file.

19. The system of claim 17, wherein the lower priority activity comprises a data flush associated with a file, and wherein transacting the one or more memory operations comprises closing a handle associated with the file to enable the data flush to occur.

20. The system of claim 17, wherein the computer-executable instructions also cause the system to determine that the high priority activity has stopped reading data from the memory by:
   starting a timer responsive to an instance of the process accessing the memory; and
   determining that the graphical user interface has stopped reading data from the memory responsive to an expiration of the timer.

21. The system of claim 17, wherein the one or more data writes by the high priority activity are delayed while caching the one or more memory operations of the lower priority activity.

22. The system of claim 17, wherein the high priority activity is associated with a graphical interface.

* * * * *